(12) United States Patent
Bhatt et al.

(10) Patent No.: US 9,098,619 B2
(45) Date of Patent: Aug. 4, 2015

(54) METHOD FOR AUTOMATED ERROR DETECTION AND VERIFICATION OF SOFTWARE

(75) Inventors: Devesh Bhatt, Maple Grove, MN (US); David V. Oglesby, Brooklyn Center, MN (US); Kirk A. Schloegel, Minneapolis, MN (US); Gabor Madl, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 1295 days.

(21) Appl. No.: 12/949,596

(22) Filed: Nov. 18, 2010

(65) Prior Publication Data

US 2011/0258607 A1 Oct. 20, 2011

Related U.S. Application Data

(60) Provisional application No. 61/325,804, filed on Apr. 19, 2010.

(51) Int. Cl.
*G06F 9/44* (2006.01)
*G06F 11/36* (2006.01)

(52) U.S. Cl.
CPC ................................ *G06F 11/3608* (2013.01)

(58) Field of Classification Search
None
See application file for complete search history.

(56) References Cited

U.S. PATENT DOCUMENTS

| 5,150,367 | A | 9/1992 | Tong et al. |
|---|---|---|---|
| 5,272,704 | A | 12/1993 | Tong et al. |
| 5,729,554 | A | 3/1998 | Weir et al. |
| 5,913,023 | A | 6/1999 | Szermer |
| 5,918,037 | A | 6/1999 | Tremblay et al. |
| 6,002,869 | A | 12/1999 | Hinckley |
| 6,173,440 | B1 | 1/2001 | Darty |
| 6,449,667 | B1 | 9/2002 | Ganmukhi et al. |
| 6,473,794 | B1 | 10/2002 | Guheen et al. |

(Continued)

FOREIGN PATENT DOCUMENTS

| CN | 1828612 | 9/2006 |
|---|---|---|
| EP | 1577755 | 9/2005 |
| EP | 1677187 | 7/2006 |

OTHER PUBLICATIONS

Schulte et al, "Dynamic Analysis of Bounds Versus Domain Propagation", 2008, Spring-Verlag Berling Heidelberg.*

(Continued)

*Primary Examiner* — Lewis A Bullock, Jr.
*Assistant Examiner* — Mark Gooray
(74) *Attorney, Agent, or Firm* — Fogg & Powers LLC

(57) ABSTRACT

A method for automated error detection and verification of software comprises providing a model of the software, the model including one or more model inputs and one or more model outputs, and a plurality of blocks embedded within the model each with an associated block type, the block types each having a plurality of associated block-level requirements. The method further comprises topologically propagating from the model inputs, a range of signal values or variable values, and error bounds, across computational semantics of all the blocks to the model outputs. Each behavior pivot value for a given block is identified and examined to determine if modifying or extending the propagated range by the error bound will or may cause a signal value to fall on either side of the behavioral pivot value. All occurrences of the signal value that will or may fall on either side of the behavioral pivot value are reported.

20 Claims, 2 Drawing Sheets

(56) References Cited

U.S. PATENT DOCUMENTS

| | | | |
|---|---|---|---|
| 6,570,459 | B1 | 5/2003 | Nathanson et al. |
| 6,615,166 | B1 | 9/2003 | Guheen et al. |
| 6,671,874 | B1 | 12/2003 | Passova |
| 6,938,228 | B1 | 8/2005 | Zhong |
| 6,944,848 | B2 | 9/2005 | Hartman |
| 7,051,322 | B2 | 5/2006 | Rioux |
| 7,203,881 | B1* | 4/2007 | Williams et al. ............... 714/741 |
| 7,219,328 | B2 | 5/2007 | Schloegel |
| 7,272,752 | B2 | 9/2007 | Farchi et al. |
| 7,296,188 | B2 | 11/2007 | Paternostro |
| 7,322,017 | B2 | 1/2008 | Baumgartner et al. |
| 7,412,430 | B1 | 8/2008 | Moore |
| 7,457,729 | B2 | 11/2008 | Khoche et al. |
| 7,475,370 | B2 | 1/2009 | Baumgartner et al. |
| 7,490,319 | B2 | 2/2009 | Blackwell et al. |
| 7,644,334 | B2 | 1/2010 | Hickman et al. |
| 7,698,668 | B2 | 4/2010 | Balasubramanian et al. |
| 7,735,058 | B2 | 6/2010 | Kinsella et al. |
| 7,788,615 | B2 | 8/2010 | Baumgartner et al. |
| 8,423,879 | B2 | 4/2013 | Bhatt et al. |
| 8,539,451 | B2 | 9/2013 | Ivancic et al. |
| 2003/0128214 | A1 | 7/2003 | Oglesby |
| 2004/0044990 | A1 | 3/2004 | Schloegel |
| 2004/0088677 | A1 | 5/2004 | Williams |
| 2004/0169591 | A1 | 9/2004 | Erkkinen |
| 2005/0004786 | A1 | 1/2005 | Thomason |
| 2005/0043913 | A1 | 2/2005 | Hyde et al. |
| 2005/0097515 | A1 | 5/2005 | Ribling |
| 2005/0114841 | A1 | 5/2005 | Moskowitz et al. |
| 2005/0223295 | A1 | 10/2005 | Hermes et al. |
| 2006/0010428 | A1 | 1/2006 | Rushby |
| 2006/0101402 | A1 | 5/2006 | Miller |
| 2006/0155520 | A1 | 7/2006 | O'Neill et al. |
| 2006/0206870 | A1 | 9/2006 | Moulden, Jr. |
| 2006/0253839 | A1 | 11/2006 | Avritzer |
| 2006/0265691 | A1 | 11/2006 | Klinger |
| 2007/0028219 | A1 | 2/2007 | Miller |
| 2007/0028220 | A1 | 2/2007 | Miller |
| 2007/0266366 | A1 | 11/2007 | Bucuvalas |
| 2007/0288899 | A1 | 12/2007 | Fanning et al. |
| 2008/0015827 | A1 | 1/2008 | Tryon, III et al. |
| 2008/0028364 | A1 | 1/2008 | Triou |
| 2008/0086705 | A1 | 4/2008 | Balasubramanian et al. |
| 2008/0120521 | A1 | 5/2008 | Poisson et al. |
| 2008/0126902 | A1* | 5/2008 | Hickman et al. ............... 714/741 |
| 2008/0180437 | A1* | 7/2008 | Clark et al. ................... 345/420 |
| 2009/0083699 | A1 | 3/2009 | Santhanam |
| 2009/0287958 | A1 | 11/2009 | Bhatt et al. |
| 2009/0287963 | A1 | 11/2009 | Oglesby et al. |
| 2010/0175052 | A1 | 7/2010 | Prasad et al. |
| 2010/0192128 | A1 | 7/2010 | Schloegel et al. |
| 2011/0054835 | A1 | 3/2011 | Takamasu et al. |
| 2012/0185729 | A1 | 7/2012 | Bhatt et al. |
| 2012/0210173 | A1 | 8/2012 | Schloegel et al. |

OTHER PUBLICATIONS

Alur, "A Theory of Timed Automata", "Theorectical Computer Science", Apr. 1994, pp. 183-235, vol. 126, Publisher: Elsevier Science B.V.

Alur, "The Algorithmic Analysis of Hybrid Systems", "Theoretical Computer Science", Feb. 1995, pp. 3-34, No. 138.

Anirudhan et al., "Symbolic Test Generation for Hierarchically Modeled Digital Systems", "International Test Conference 1989", 1989, pp. 461-469, Publisher: IEEE, Published in: Washington DC, USA.

Benveniste, "The Synchronous Languages 12 Years Later", "Proceedings of the IEEE", Jan. 2003, pp. 64-83, vol. 91, No. 1, Publisher: IEEE.

Bhatt et al., "Towards Scalable Verification of Commercial Avionics Software", "Proceedings of the AIAA Infotech@Aerospace Conference", Apr. 2010, pp. 1-8, Publisher: American Institue of Aeronautics and Astronautics, Published in: USA.

Bhatt et al., "HiLITE: An Approach and Tool for Test Generation from Model-Based Functional Requirements", "Presentation—1st International Workshop on Aerospace Software Engineering", May 22, 2007, Publisher: Honeywell International Inc.

Bhatt, "Towards Scalable Verification of Commercial Avionics Software", "In Proceedings of the AIAA Infotech at Aerospace Conference", Apr. 2010, pp. 1-7, Publisher: American Institute of Aeronautics and Astronautics.

Bhatt, D. et al., "HiLite-Honeywell Integrated Lifecycle Tools and Environment", "Aerospace Advanced Technology-Slides Version 2", Apr. 2008, Publisher: Honeywell.

Borcsok et al., "An Automated Software Verification Tool for Model-based Development of Embedded Systems with Simulink", "XXII International Symposium on Information, Communication and Automation Technologies", 2009, Publisher: IEEE.

Ferrell, "RTCA DO-17B/EUROCAE ED-12B", 2001, pp. 1-11, No. 27, Publisher: CRC Press LLC.

Hamon, "An Operational Semantics for Stateflow", "International Journal on Software Tools for Technology Transfer (STTT)", Oct. 2007, pp. 447-456, vol. 9, No. 5-6, Publisher: SRI International.

Hamon, "A Denotational Semantics for Stateflow", "In Proceedings of EMSOFT", 2005, pp. 164-172, Publisher: EMSOFT '05.

Harel, "Statecharts: A Visual Formalism for Complex Systems", "Science of Computer Programming", 1987, pp. 231-274, vol. 8, Publisher: Elsevier Science Publishers B.V.

Hi-Keung, "Test Generation for Sequential Circuits", "IEEE Transactions on Computer Aided Design of Integrated Circuits and Systems", Oct. 1, 1988, pp. 1081-1093, vol. 7, No. 10, Publisher: IEEE, Published in: Piscataway, NJ, USA.

"LDRA Tool Suite", 2011, Publisher: LDRA Ltd.

"Matlab and Simulink", 1994-2011, Publisher: The MathWorks, Inc.

"Vector Software. Vectorcast.", 2011, Publisher: Vector Software.

Kahn, "The Semantics of a Simple Language for Parallel Programming", "In Information Processing", 1974, pp. 471-475.

Lee, "Synchronous Data Flow", "Proceedings of IEEE", Sep. 1987, pp. 1235-1245, vol. 75, No. 9, Publisher: IEEE.

"Simulink—Simulation and Model-Based Design", 2007, Publisher: The MathWorks, Inc.

Moore, R.E., "Interval Arithmetic and Automatic Error Analysis in Digital Computing", "Applied Mathematics and Statistics Laboratories", Nov. 15, 1962, No. 25, Publisher: Stanford University California.

Neema, S. et al., "Signal Processing Platform: A Tool Chain for Designing High Performance Signal Processing Applications", "Proceedings IEEE", Apr. 8-10, 2005, pp. 302-307, Publisher: Southeastcon, Published in: Ft. Lauderdale, FL.

Niermann et al., "HITEC: A Test Generation Package for Sequential Circuits ", "Proceedings of the European Conference on Design Automation ", 1991, pp. 214-218, Publisher: IEEE , Published in: Los Alamitos, CA, USA.

"OMG Unified Modeling Language Specification, version 1.5", Mar. 1, 2003, pp. 3-135 to 3-154, vol. 3, No. 9, Publisher: Object Management Group (OMG).

Ouaknine, "On the Language Inclusion Problem for Timed Automata: Closing a Decidability Gap", "In Proceedings of Logic in Computer Science", 2004, pp. 54-63.

Petri, "Communication With Automata", "PhD Thesis", Jan. 1966, pp. 1-97, vol. 1, Publisher: University of Bonn.

Rushby, "An Evidential Tool Bus", "Proc. of 7th International Conference on Formal Engineering Methods", 2005, pp. 1-10, Publisher: SRI International, Published in: Menlo Park, California, USA.

"Quantifying Error Propagation in Data Flow Models", pp. 1-10, Publisher: Honeywell Aerospace Advanced Technology.

Sorensen, Uffe, "Static Single-Assignment Form and Value Range Propagation for UPPAAL", Jun. 2008.

"Stateflow 7-Design and Simulate State Machines and Control Logic", 2007, Publisher: The Mathworks.

Tiwari, "Formal Semantics and Analysis Methods for Simulink Stateflow Models", "http://www.csl.sri.com/users/tiwari/html/stateflow.html Accessed May 11, 2011", 2002, Publisher: SRI International.

"SCADE Suite", 2011, Publisher: Esterel Technologies, Inc., Published in: France.

Schloegel, "Error Propagation in a System Model", "U.S. Appl. No. 13/167,983, filed Jun. 24, 2011".

(56) References Cited

OTHER PUBLICATIONS

European Patent Office, "Office Action", "from Foreign Counterpart of U.S. Appl. No. 13/006,750", Jul. 2, 2012, pp. 1-8, Published in: EP.
European Patent Office, "Office Action", "from Foreign Counterpart of U.S. Appl. No. 12/949,596", Jan. 19, 2012, Published in: EP.
U.S. Patent & Trademark Office, "Final Office Action", from U.S. Appl. No. 13/167,983, Sep. 8, 2014, pp. 1-19, Published in: US.
European Patent Office, "European Search Report", Oct. 7, 2011, Published in: EP.
Schulte et al, "Dynamic Analysis of Bounds Versus Domain Propagation", "Logic Programming", Dec. 9, 2008, pp. 332-346, Publisher: Springer Berlin Heidelberg.
Agrawal et al., "Semantic Tranlation of Simulink/Stateflow Models to Hybrid Automata Using Graph Transformations", "Electronic Notes in Theoretical Computer Science", 2004, vol. 109.
Alur et al., "Symbolic Analysis for Improving Simulation Coverage of Simulink/Stateflow Models", "EMSOFT'08", Oct. 19-24, 2008, Published in: Atlanta, Georgia, USA.
Bhatt, D. et al., "Model-Based Development and the Implications to Design Assurance and Certification", "Digital Avionics Systems Conference", Oct. 30, 2005, vol. 2, Publisher: IEEE.
Bhatt et al., "An Approach and Tool for Test Gernation From Model-Based Functional Requirements", May 2007, Publisher: Honeywell Laboratories, Minneapolis.
Durrieu et al., "Formal Proof and Test Case Generation for Critical Embedded Systems Using Scade", "World Computer Congress-IFIP", 2004.
Fosdick, et al., "Data Flow Analysis in Software Reliability", "Computing Surveys", Sep. 1976, pp. 305-330, vol. 8, No. 3, Publisher: Association for Computing Machinery (ACM), Published in: Boulder, Colorado, US.
Halbwachs et al., "The Synchronous Dataflow Programming Language Lustre", "Proceedings of the IEEE", Sep. 1991, vol. 79, No. 9, Publisher: IEEE.
Henzinger et al., "What'S Decidable About Hybrid Automata?", "Jouranl of Computer and System Sciences", 1998, vol. 57.
Tripakis et al., "Translating Discrete—Time Simulink to Lustre", "ACM Journal Name", Jan. 2005, pp. 1-40, vol. V, No. N.
Zhou et al., "A Framework of Hierarchical Requirements Patterns for Specifying Systems of Interconnected Simulink/Stateflow Modules", 2007.
U.S. Patent and Trademark Office, "Office Action", "from U.S. Appl. No. 13/167,983", Nov. 20, 2013, pp. 1-35, Published in: US.
University of Regina, "Chapter Three, Error Propagation in Calculations", "Physics Undergraduate Laboratory Companion", Jul. 2008, pp. 9-20.
U.S. Patent and Trademark Office, "Notice of Allowance", from U.S. Appl. No. 13/167,983, Dec. 8, 2014, pp. 1-8, Published in: US.
State Intellectual Property Office, P.R. China, "Office Action from CN Application No. 201110096514.8 mailed Dec. 9, 2014", "from Foreign Counterpart of U.S. Appl. No. 12/949,596", Dec. 9, 2014, pp. 1-9, Published in: CN.
U.S. Patent and Trademark Office, "Office Action", "U.S. Appl. No. 13/006,750", May 17, 2013, pp. 1-53.
Blume et al., "Symbolic Range Propagation", 1995, pp. 357-363.
Harrison, "Compiler Analysis of the Value Ranges for Variables", "IEEE Transactions on Software Engineering", May 1997, pp. 243-250, vol. SE-3, No. 3.

\* cited by examiner

METHOD FOR AUTOMATED ERROR DETECTION AND VERIFICATION OF SOFTWARE

CROSS-REFERENCE TO RELATED APPLICATION

This application claims the benefit of U.S. Provisional Patent Application Ser. No. 61/325,804, filed on Apr. 19, 2010, which is incorporated herein by reference.

BACKGROUND

Flight-critical software is part of an aircraft system that includes sensors and actuators, and integrates physical processes with computation. This software controls and interacts with many different, mixed-criticality subsystems, such as the engine, guidance and navigation, fuel management, flight control, communication, collision detection and resolution, climate control, and entertainment.

The algorithms underlying the software are based on mathematical principles such as algebra, analysis, geometry, and trigonometry. The calculations often involve nonlinear arithmetic that is not adequately supported by formal tools due to the complexity of the necessary calculations. Typically, models based on continuous mathematics are implemented using discrete software systems. In such models, numeric values are approximated by floating-point representations that introduce errors. Floating-point computations can likewise introduce errors. In addition, the software itself is executed on a distributed platform that introduces numerical and timing errors due to jitter, sensor precision, and external mechanical or functional errors.

These errors can accumulate and may qualitatively change the behavior of the system. Any time the system must make a decision (e.g., an if-then-else or loop construct) that compares two values, either or both of those values may be offset by error to some degree. This can cause a system to perform different behaviorally than if the values were precisely represented. The value around which execution changes is called a "behavioral pivot value." Decisions that depend on behavioral pivot values can affect the timing behavior and physical performance of the system controlled by the software. However, current tools either do not take these errors into account or are not scalable enough to support industrial-sized problems.

SUMMARY

A method and system for automated error detection and verification of software is provided. The method comprises providing a model of the software, with the model including one or more model inputs and one or more model outputs, and a plurality of blocks embedded within the model each with an associated block type, the block types each having a plurality of associated block-level requirements. The method further comprises topologically propagating from the model inputs, a range of signal values or variable values, and error bounds, across computational semantics of all the blocks to the model outputs. Each behavior pivot value for a given block is identified and examined to determine if modifying or extending the propagated range by the error bound will or may cause a signal value to fall on either side of the behavioral pivot value. All occurrences of the signal value that will or may fall on either side of the behavioral pivot value are reported.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
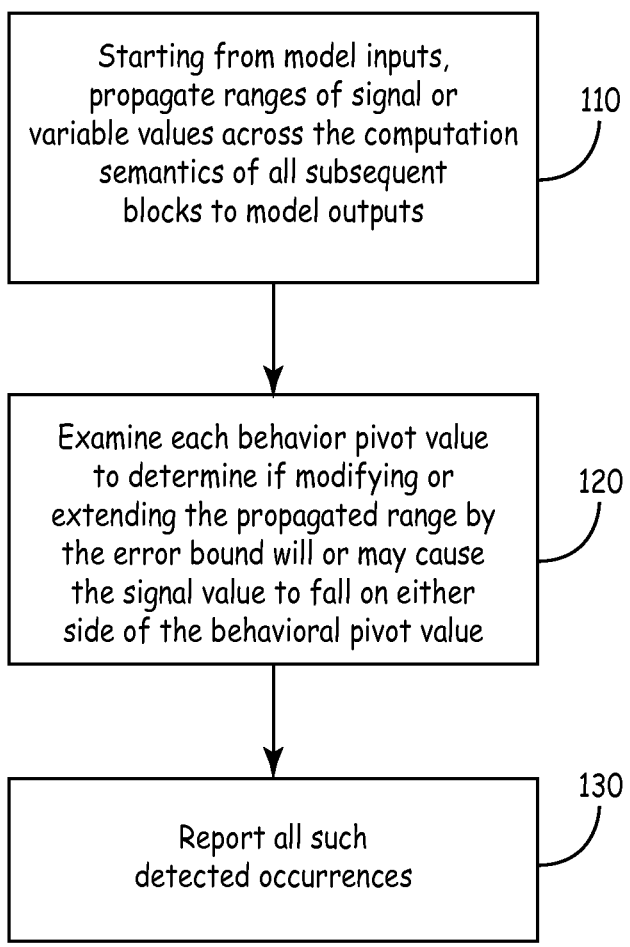
FIG. 1 is a process flow diagram showing a general overview of a process for automated verification of software according to one approach.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The invention relates to a method and system for automated detection of software errors; in particular, defects caused by a combination of (i) operational ranges influenced and transformed by the required system behavior, (ii) behavioral pivot values, and (iii) numerical errors. The present method provides for the symbolic analysis of models, which combines computation, control, and real-time properties in a unified analysis framework based on extensions to range arithmetic.

The present approach also utilizes a model-based approach for the verification of software designs and the resulting code. The inputs to the present method are (i) a model of the system behavioral requirements, (ii) behavioral semantics of a model's computational elements, (iii) data type- and platform-dependent constraints/characteristics, and (iv) normal and maximum operating signal ranges at models inputs. The output is a report of potential errors that may occur due to numerical error causing particular signal values to cross behavioral pivot values. This leads to indeterminate behavior around behavioral pivot values.

This approach provides superior quality of results compared to simulation-based verification and superior scalability compared to traditional model checking methods. Therefore, the present method is particularly useful in the automated scalable verification of commercial avionics software developed using a model-based approach. In particular, the present approach provides for the automated verification of avionics systems for the certification of complex commercial avionics applications, such as flight controls and engine controls. By utilizing the present approach, it is possible to achieve a significant improvement on average in certification costs compared to traditional analysis and testing methods, while maintaining scalability on complex real-life problems.

In the following description, the computational elements are referred to as "blocks" which are the basic units of computation in data flow diagrams, and in an embodiment may be represented by a combination of in-line code and function calls. All blocks that are instantiated in a model have an associated "block type" that defines their inputs, outputs, and a plurality of functional requirements.

The present technique extends existing range propagation and analysis techniques to allow for uncertainty of values due to representational limitations and other sources of errors. Current techniques propagate ranges through behavioral system specifications and analyze the effects of these ranges on incident computations. For example, such techniques may identify if the range of the denominator of a division operation crosses zero, and hence, there is a possibility of a divideby-zero exception. Current techniques do not extend the propagated ranges with error bounds.

The present method analyzes behavioral pivot values that are detected in the behavior model with respect to an error value that extends the propagated ranges of the block inputs to determine if any behavioral pivot value may fall within the error bounds. When such a situation occurs, it is in general difficult and may be impossible to predict a priori the result of the decision. This indeterminism may result in delay, jitter, latency, behavioral, and computational errors. The present approach detects the possibility of such indeterminism.

In the present method, a forward propagation is performed to determine the possible ranges of values for all the model's internal and external signals. This propagation is based upon the computational semantics of the model's functional elements, and is performed topologically from the model inputs to the model outputs. In the present method, ranges of signal values are modeled as complex intervals with additional properties such as data type and platform-dependent constraints and characteristics, including errors associated with data type or the platform. Interval arithmetic is performed as appropriate to project value ranges across the semantics of the model's computational elements.

After all input ranges incident upon a particular block are computed, a check is made to ascertain whether behavior pivot values of each computational element manifest themselves within the ranges at the inputs/outputs with an allowance for error. The blocks can be shown in data flow diagrams as nodes, and can have different shapes. Every block has some number of input and/or output ports as defined by its block type. The input ports present the signal values that are used as inputs by the block's computation. The output ports present the signal values that are produced as results by the block's computation. In one embodiment where the block is implemented as a function call, the input ports are analogous to parameters that are passed into the function call and the output ports carry the results (return values) of the function call.

The software models utilized in the present approach can be created using various techniques, such as MATLAB Simulink or other modeling programs. Simulink is a commercial tool for modeling, simulating, and analyzing multi-domain dynamic systems, and represents a large class of models that can be expressed by data flow semantics. In another embodiment, a source code parser can be used to automatically generate the model from existing source code.

Further details of the present method are described as follows with reference to the drawings.

FIG. 1 depicts a general overview of a process for automated error detection and verification of software according to one approach. Initially, a model that specifies the behavior of the software is provided having one or more model inputs and one or more model outputs. In one embodiment, this model is a design model. In another embodiment, this model is a requirements model. In a further embodiment, this is a model that is automatically generated from source code by a source code parser. The syntax of the model includes a plurality of blocks that are connected together, from input to output, starting at the model inputs and ending at the model outputs. For example, if a block labeled A is connected by one or more of its outputs to one or more inputs of another block labeled B, block A is referred to as being "upstream" of block B. Similarly, block B is "downstream" of block A.

The process shown in FIG. 1 starts from model inputs, with optionally specified ranges of signal values, being propagated topologically across the model as specified by the semantics of all subsequent blocks to the model outputs (110). During propagation, each behavior pivot value is identified and examined to determine if modifying or extending the propagated range by the error bound will or may cause the signal value to fall on either side of the behavioral pivot value (120). All such detected occurrences of behavioral pivot values are then reported (130).

Figure 2:
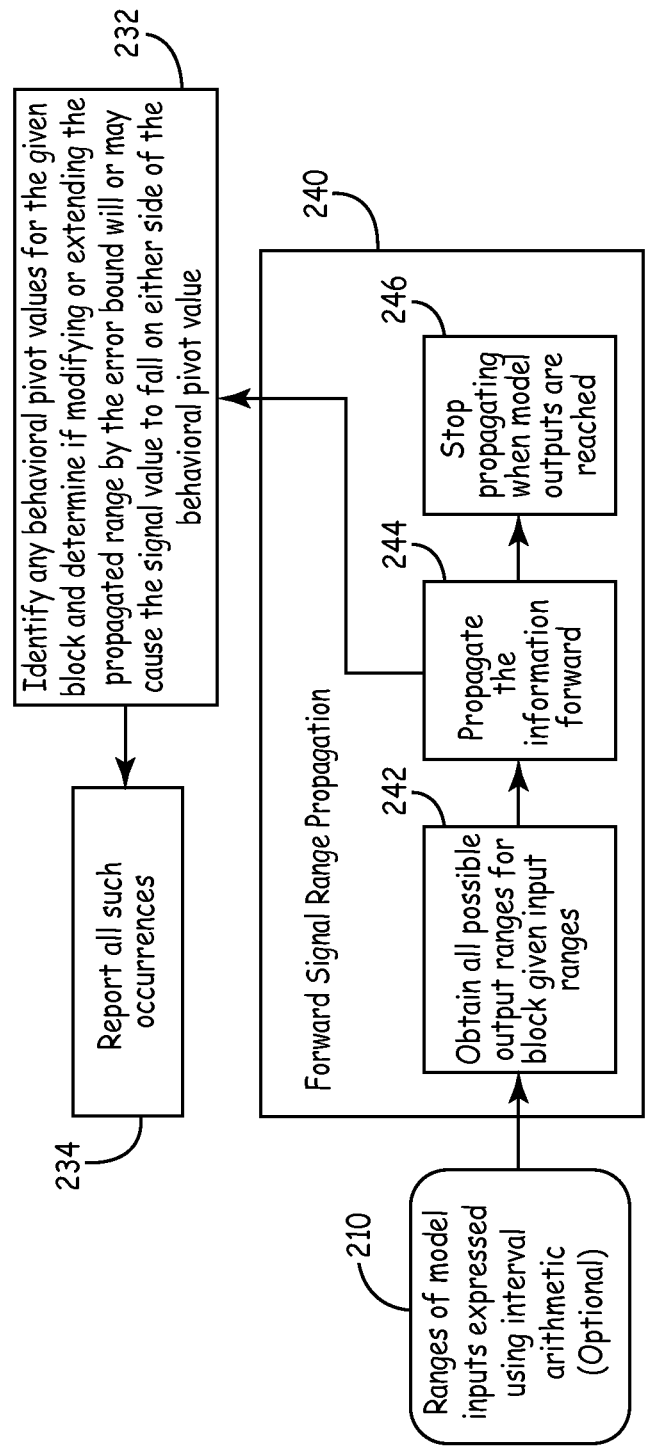
FIG. 2 is a process flow diagram showing further details of the process steps for the automated verification of software.

FIG. 2 depicts further details of the process for automated error detection and verification of software. Initially, optional external constraints at one or more model inputs are provided at 210 as normal and maximum operating ranges that can be expressed using intervals. The intervals can be augmented with implementation-independent and implementation-dependent data-type representation information. If constraints are not provided at one or more model inputs, then default values may be used in one embodiment. Another embodiment may use limits imposed by data-type implementation. The resulting data is input to a forward signal propagation module 240 for further manipulation.

In the forward signal propagation module 240, the process starts with the (optional) model input ranges at 210. For each model input, all immediate downstream blocks are identified. For each such block, the possible ranges of block outputs are determined based on the ranges of input values at 242. The determined output value ranges are then propagated to all the immediate downstream blocks as block input ranges at 244, and the range of possible outputs values are computed. This propagation continues until the model outputs are reached at 246.

During the forward signal propagation process, behavioral pivot values for the given block are identified at 232. In one embodiment, a function that identifies the behavior pivot values may do so by examining all expressions guarding a decision in the control flow of the model, such as the condition of an If-Then statement. The function may examine the expression to determine if it includes a reference to a signal variable. If so, the function may compute the pivot value for which the condition transfers from TRUE to FALSE. For example, given a block that behaves as the statement IF (x>2) THEN y:=5, the function may determine that signal x has a pivot value of two.

In one embodiment, single-value ranges are also detected at 232. A single-value range is one in which the minimum value is equal to the maximum value. For all single-value ranges, it is then determined if modifying or extending the single-value range by the error bound will or may cause the signal value to fall on either side of the behavioral pivot value at 232. All such detected occurrences are then reported at 234.

In another embodiment, modifying or extending a range by the error bound can be performed by adding the error bound to the maximum value of the range and subtracting the error bound from the minimum value of the range. In a further embodiment for which two distinct error bounds are known, modifying or extending a range by the error bound can be performed by adding the high-end error bound to the maximum value of the range and subtracting the low-end error bound from the minimum value of the range.

In one embodiment, it may additionally be determined if modifying or extending a non-single value propagated range by the error bound will or may cause the signal value to fall on either side of the behavioral pivot value at 232. All such detected occurrences are then reported at 234.

In another embodiment, it may additionally be determined if modifying any particular value contained within a given range by the error bound will or may cause the signal value to fall on either side of the behavioral pivot value at 232. However, this analysis is more computationally intensive in general, leading to longer run times required to complete the verification. All such detected occurrences are then reported at 234.

In a further embodiment, the occurrences of cases in which modifying any particular value contained within a given range by the error bound will or may cause the signal value to fall on either side of the behavioral pivot value, may also be reported to a test generator such as an automated test-generation tool. This information can allow the test generator to compute a safe margin that is greater than the error bound for automatically generated tests that need to guide the result of a particular decision with an identified behavioral pivot point.

The present method can be implemented using a software verification tool, such as the Honeywell Integrated Lifecycle Tools & Environment (HiLiTE) verification tool, which can be applied to the verification of several flight-critical systems such as flight controls, engine controls, and environment control systems. The HiLiTE tool performs comprehensive analyses (e.g., range and type propagation, reachability analysis, model correctness, etc.) and auto-generates requirements-based test vectors on data flow diagrams.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, Blu-ray discs, or other optical storage disks; nonvolatile ROM, RAM, and other like media; or any other media that can be used to carry or store desired program code in the form of computer executable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for automated error detection and verification of software, the method comprising:
   providing a model of the software, the model comprising one or more model inputs and one or more model outputs, and a plurality of blocks embedded within the model each with an associated block type, the block types each having a plurality of associated block-level requirements;
   topologically propagating from the model inputs, a range of signal values or variable values, and error bounds, across computational semantics of all the blocks to the model outputs with implementation-independent and implementation-dependent type information;
   identifying and examining each behavior pivot value for a given block to determine if modifying or extending the propagated range by the error bound will or may cause a signal value to fall on either side of the behavioral pivot value; and
   reporting all occurrences of the signal value that will or may fall on either side of the behavioral pivot value.

2. The method of claim 1, wherein topologically propagating from the model inputs comprises providing one or more range and error bounds of input values.

3. The method of claim 2, wherein the range and error bounds of input values are expressed using intervals augmented with the implementation-independent and implementation-dependent type information.

4. The method of claim 1, wherein modifying or extending the propagated range by the error bound is performed by adding the error bound to a maximum value of the range and subtracting the error bound from a minimum value of the range.

5. The method of claim 1, wherein modifying or extending the propagated range by the error bound is performed by adding a high-end error bound to a maximum value of the range and subtracting a low-end error bound from a minimum value of the range.

6. The method of claim 1, wherein the propagated range comprises a single value range.

7. The method of claim 1, wherein all occurrences of the signal value that will or may fall on either side of the behavioral pivot value is reported to an automated test-generation tool.

8. The method of claim 1, wherein the model is automatically generated from source code by a source code parser.

9. A computer program product, comprising:
   a non-transitory computer readable medium having instructions stored thereon executable by a processor to perform a method for automated error detection and verification of software, the method comprising:
      providing a model of the software, the model comprising one or more model inputs and one or more model outputs, and a plurality of blocks embedded within the model each with an associated block type, the block types each having a plurality of associated block-level requirements;
      topologically propagating from the model inputs, a range of signal values or variable values, and error bounds, across computational semantics of all the blocks to the model outputs with implementation-independent and implementation-dependent type information;
      identifying and examining each behavior pivot value for a given block to determine if modifying or extending the propagated range by the error bound will or may cause a signal value to fall on either side of the behavioral pivot value; and reporting all occurrences of the signal value that will or may fall on either side of the behavioral pivot value.

10. The computer program product of claim 9, wherein topologically propagating from the model inputs comprises providing one or more range and error bounds of input values.

11. The computer program product of claim 10, wherein the range and error bounds of input values are expressed using intervals augmented with the implementation-independent and implementation-dependent type information.

12. The computer program product of claim 9, wherein modifying or extending the propagated range by the error bound is performed by adding the error bound to a maximum value of the range and subtracting the error bound from a minimum value of the range.

13. The computer program product of claim 9, wherein modifying or extending the propagated range by the error bound is performed by adding a high-end error bound to a maximum value of the range and subtracting a low-end error bound from a minimum value of the range.

14. The computer program product of claim 9, wherein the propagated range comprises a single value range.

15. The computer program product of claim 9, wherein all occurrences of the signal value that will or may fall on either side of the behavioral pivot value is reported to an automated test-generation tool.

16. The computer program product of claim 9, wherein the model is automatically generated from source code by a source code parser.

17. A system for automated error detection and verification of software, the system comprising:

at least one processor; and at least one computer readable medium operatively coupled to the processor, the computer readable medium having instructions stored thereon executable by the processor to:

provide a model of the software, the model comprising one or more model inputs and one or more model outputs, and a plurality of blocks embedded within the model each with an associated block type, the block types each having a plurality of associated block-level requirements;

topologically propagate from the model inputs, a range of signal values or variable values, and error bounds, across computational semantics of all the blocks to the model outputs with implementation-independent and implementation-dependent type information;

identify and examine each behavior pivot value for a given block to determine if modifying or extending the propagated range by the error bound will or may cause the signal value to fall on either side of the behavioral pivot value; and report all occurrences of a signal value that will or may fall on either side of the behavioral pivot value.

18. The system of claim 17, wherein the topological propagation from the model inputs is carried out by instructions executable by the processor to provide one or more range and error bounds of input values.

19. The system of claim 18, wherein the range and error bounds of input values are expressed using intervals augmented with the implementation-independent and implementation-dependent type information.

20. The system of claim 17, wherein the model is automatically generated from source code by a source code parser.

* * * * *